Dec. 26, 1950 S. J. BEGUN 2,535,481

DEMAGNETIZING APPARATUS FOR MAGNETIC RECORDERS

Filed Oct. 15, 1946 2 Sheets-Sheet 1

INVENTOR.
S. J. BEGUN
BY Pinelis & Greene

Dec. 26, 1950 S. J. BEGUN 2,535,481

DEMAGNETIZING APPARATUS FOR MAGNETIC RECORDERS

Filed Oct. 15, 1946 2 Sheets-Sheet 2

INVENTOR.
S. J. BEGUN

BY

Pirelas & Greene

Patented Dec. 26, 1950 2,535,481

UNITED STATES PATENT OFFICE 2,535,481

DEMAGNETIZING APPARATUS FOR MAGNETIC RECORDERS

Semi Joseph Begun, Cleveland Heights, Ohio, assignor to The Brush Development Company, Cleveland, Ohio, a corporation of Ohio Application October 15, 1946, Serial No. 703,343

1 Claim. (Cl. 179—100.2)

This invention relates to magnetic recording apparatus for magnetically recording signals on a moving elongated permanently magnetizable record track, from which the recorded signals may be reproduced. This invention is specifically directed to the type of recording apparatus in which an A. C. bias current is used for recording.

Among the objects of this invention is the provision of a recording apparatus in which the record track moving for a recording operation may be magnetically neutralized so as to be prepared for the recording by means of a magnetic field which alternates at a low frequency.

Another object of the invention is the provision of a recording apparatus having an erasing field along which the record track is easily threaded.

The foregoing and other objects of the invention will be best understood from the following description of exemplifications thereof, reference being had to the accompanying drawings, wherein Fig. 1 is a curve diagram which illustrates the magnetic neutralization process;

Figure 5:
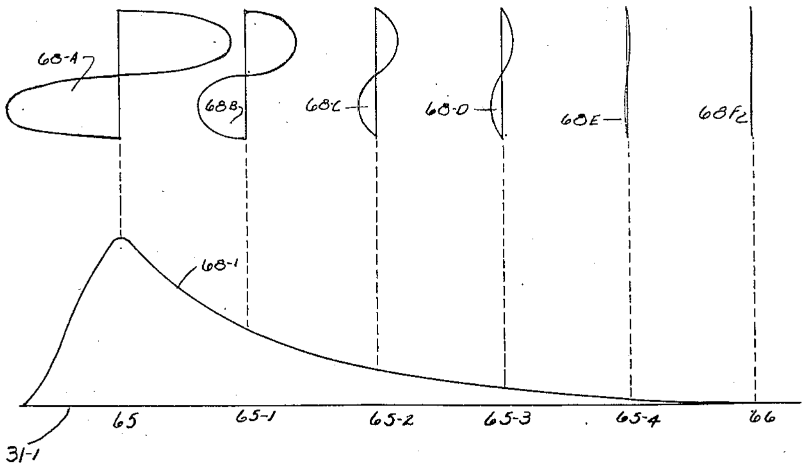
Figure 6:
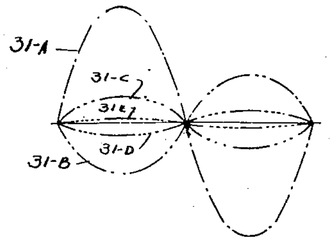

Figs. 5 and 6 diagrammatically illustrate the operation of the apparatus of the invention.

Figure 1:
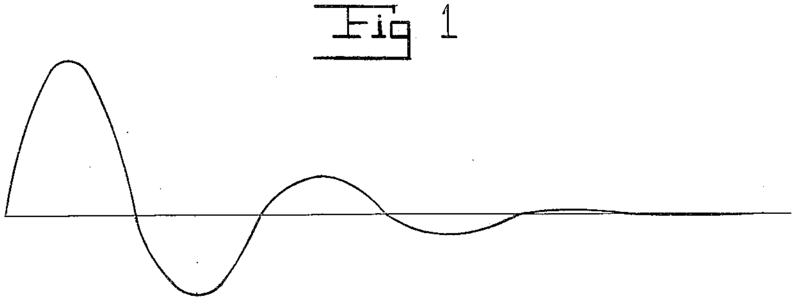

In the recording of signals on moving magnetic record tracks under the influence of a superposed high frequency A. C. bias, the record track is first magnetically neutralized, i. e., demagnetized, so as to be in the proper condition for receiving the recording. The demagnetization is effected by subjecting the record track to a decaying alternating magnetic field which impresses on its moving elements a peak value of magnetization sufficient to saturate them, followed by the gradual decay of the field for at least about three cycles. The demagnetization effected by such treatment is illustrated in Fig. 1 wherein is plotted against time as abscissa, ordinates representing the residual magnetism of the medium being exposed to a strong and gradually decaying alternating magnetic field. The initial strong field induces a maximum magnetization in all the elements as they are exposed, thus effectively removing any prior flux variation between elements. As the impressed field alternates and decays the residual magnetism follows the curve in Fig. 1 and is smoothly led to zero. Usually a minimum of about three complete cycles of decaying field are necessary to insure that each alternation effectively reverses the flux remaining in each element and to also insure that the ultimate remanence is substantially zero and does not affect the recording of the desired signal.

The required neutralizing or erasing field may be impressed upon the moving magnetizable medium, such as the record track, by sending the erasing current through a coil surrounding it, but this is objectionable because the medium has to be threaded through the coil. To avoid this difficulty, practical constructions employ a magnetic core and winding structure of the general type described in the copending Dank and Begun application, Serial No. 687,047, filed July 30, 1946, in which a gap-containing closed magnetic core is placed so that the moving medium is tangentially led to and from the gap across which it links with the core, windings around the core being used to produce the alternating magnetic flux in the core. Such a neutralizing head has a fairly small gap, and although it is effective for erasing it requires operation at a very high frequency so as to squeeze in the three cycles during the time that each element of the medium is traversing the portion of its path during which it is coupled and exposed to the magnetic field existing at the small non-magnetic gap. This high frequency field must also be of substantial magnitude, and the energy supplied must be large enough not only to induce the required field strength but to overcome the eddy current losses in the core.

With conventional operation at about 20,000 cycles or higher, the eddy current losses are high enough to cause the core to become excessively hot. This heating has a deleterious effect on the characteristics of the medium, and where a non-metallic medium is used it may be mechanically distorted or charred sufficiently to render it substantially useless. The non-metallic media referred to are those described in the Kornei applications, Serial Nos. 685,092 and 685,093, filed July 20, 1946 the latter application having been abandoned, and may be plastic or paper tape, or thread having a bonded layer containing magnetizable oxides having a particle size of about one micron substantially uniformly dispersed throughout, or may merely be a self-supporting film or thread having these magnetizable oxides dispersed therethrough.

Merely increasing the size of the gap does not per se make it possible to significantly lower the frequency of the alternating erasing flux inasmuch as the magnetic field so produced does not have suitable decay characteristics. Furthermore, spreading the gap greatly increases the magnetomotive force necessary to produce the desired field strength.

Figure 2:
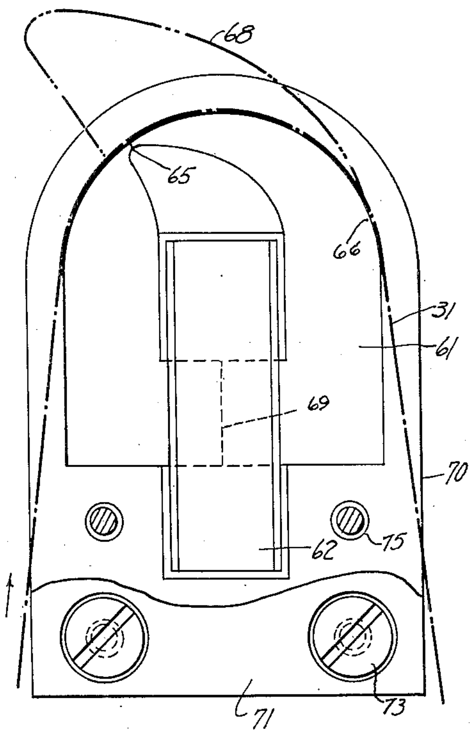
Fig. 2 is a top view of a magnetic neutralizing head according to the invention.

According to the invention these prior art difficulties are avoided by utilizing an erasing head which operates with a low frequency erasing field. One form of the invention, as illustrated in Fig. 2, utilizes a laminated magnetic closed core 61 around a portion of which is placed a winding 62, both being suitably held between two end walls 70, 71 as by screws 73. Spacers 75 may be mounted around the screws 73 so as to properly hold the end walls 70, 71. One portion of the magnetic core is convexly shaped, and the adjacent portions of the wall members project outwardly beyond the core so as to bound a guide path along which the magnetic medium 31 is moved. Adjacent to this guide path the cross section of the magnetic core is illustrated as having a minimum area at 65 and smoothly increasing in area beyond 65 in the direction the medium is moved. In the opposite direction the cross sectional area of the core is shown as increasing sharply. The remainder of the core may be of a substantially uniform cross section area. When enough current is passed through the winding 62 so as to substantially saturate the core at its widest portion there will be a leakage of flux around the tapering portion which, as indicated by the dash-double-dot line 68, will show a maximum adjacent point 65 and will gradually diminish along the guide path to the region 66. The effective demagnetizing zone extends from the maximum leakage flux region 65 to the minimum leakage region 66 and this distance may be made large enough so that a low frequency of alternation will suffice to subject the elements of a rapidly moving medium to the necessary number of decaying cycles.

The demagnetizing zone is represented in the lower portion of Fig. 5 as developed for a straight record track path 31—1 in the interest of clarity. The curve 68—1 represents the variation of the intensity of the leakage flux along this path. The curves 68A, 68B, 68C, 68D, 68E and 68F in the upper portion of Fig. 5 represent the alternating magnetic field at various locations in the path 31—1. The effect of the various portions of the field on the magnetic record track is to magnetize the record track to an extent dependent on the field strength. The magnetization produced on the moving record track by a magnetic flux alternating at a constant frequency is in the form of an undulating wave of permanent magnetism in the record track. The track so magnetized may be considered a succession of opposed elemental magnets of equal length, the length being dependent upon the magnetizing field frequency and the speed with which the record track moves, as set forth in the above-mentioned Kornei applications. At the point 65 the erasing magnetic field alternates as indicated by the sine wave 68A and induces a magnetization in an elemental passing portion of the record track. The magnetization of this elemental portion may be represented by the high amplitude curve 31A in Fig. 6. A half cycle later when the same moving elemental record track portion reaches the point 65—1 in the demagnetizing zone where the field is indicated by curve 68B its magnetism is reversed and diminished and may be indicated by the curve 31B in Fig. 6. Continued movement of the elemental record track portion for another half cycle of the neutralizing current exposes it at point 68—2 to a field represented by curve 68C and leaves a magnetism which is again reversed and is indicated by 31C. This process continues till at the region 66 where the demagnetizing field is almost undetectable as indicated by curve 68F, the residual magnetism is substantially zero.

Although a three cycle decay is illustrated in Figs. 1, 5, and 6 any lesser rate of decay requiring more cycles will operate at least as well. A faster rate of decay is in general not suitable but if only slightly faster may be used with good results.

The erasing head of Fig. 2 makes it possible to magnetically neutralize a record track as it moves at the recording speed and just before exposure to the recording flux using a 60-cycle erasing current from the regular A. C. power line and a demagnetizing zone about one inch long. This dimension provides more than enough decaying cycles for conventional record track speeds. For a record track speed of fifteen inches per second one inch provides four decaying cycles, and for a speed of eight inches per second seven and a half decaying cycles. It is obvious, however, that for recorders such as those disclosed in the above-mentioned Kornei applications where a record track speed of eight inches per second is all that is needed, a demagnetizing zone only 0.4" long is sufficient. A silicon steel core material is all that is required for such a low frequency. The laminated core construction is especially suited for magnetizable media in the form of tape, but for filamentary material, such as wire, a single lamination of sheet metal functions quite well. The single lamination may have a thickness of the order of the thickness of the filament and may have its periphery grooved to receive the filament and guide it.

Figure 4:
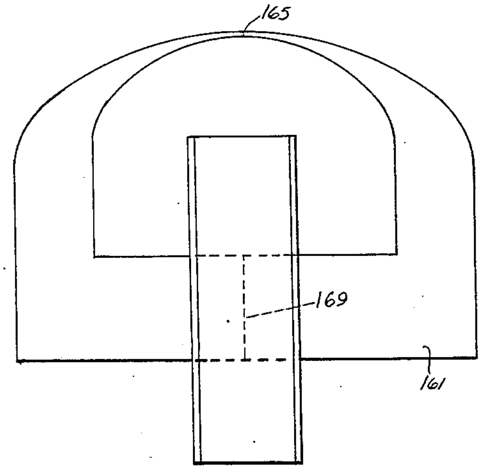
Fig. 4 illustrates a modified construction.
Figure 3:
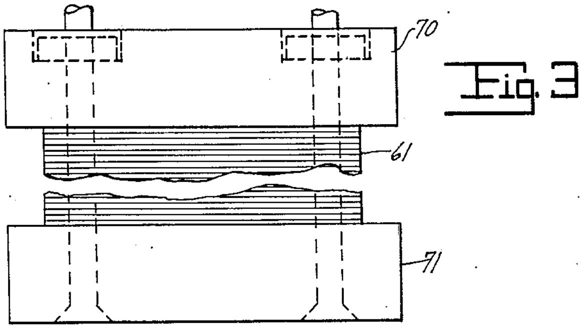
Fig. 3 is a side view of the head of Fig. 1.

The apparatus may be modified so as to enable its use with recording media moving in either direction along the guide path by tapering the core symmetrically, as shown by the core 161 in Fig. 4, which may be mounted in a manner similar to the core of Fig. 2.

The apparatus of the invention makes it unnecessary to use large amounts of high frequency energy in a magnetic recording apparatus so that the entire apparatus is simpler to construct. Furthermore, the small amount of losses produced make it unnecessary to use a heat insulating spacer between the moving medium and the core to prevent deleterious heat effects. Interposition of such a spacer in prior art erasing heads would cut down the magnetic linkage with the magnetic medium, and would necessitate further increases in energy supply and core losses.

Furthermore, there is no threading problem with the apparatus of the invention and the record track may merely be placed in the plane of the erasing core to be drawn up and held in its proper path by the impelling forces that move it during the recording. The recording path may be connected by suitably shaped slots with the available portion of the recorder so that the record track may merely be placed in the slots, as more fully described and claimed in the Dank application, Serial No. 690,378, filed August 16, 1946. The specific details of the magnetic record transducer form no part of the present invention however and any suitable arrangement may be used in place of the construction of the above-identified Dank application if desired.

The erasing core laminations may be cut at 65 and at 69, as indicated in Fig. 2, for simple mounting of the winding 62 on the stacked laminations. Other lamination cuts may be employed or the cuts may be entirely omitted if the coil 62 is built up by winding the turns around one leg of the assembled uncut laminations. The construction of Fig. 4 may be made with symmetrical laminations having cuts at 165 and 169 along the axis of symmetry so that only a single shape of stamped-out lamination sections may be used to build the core.

The expression "magnetic record transducing" as used herein in the specification and claim is intended to mean either the operation of magnetically recording signals on a magnetic recording medium, or the operation of reproducing magnetically recorded signals, or the operation of erasing magnetically recorded signals, or any combination of two or more of these operations.

It will be apparent to those skilled in the art that the novel principles of the invention disclosed herein in connection with specific exemplifications thereof will suggest various other modifications and applications of the same. It is accordingly desired that in construing the breadth of the appended claim they shall not be limited to the specific exemplifications of the invention described herein.

I claim:

In a magnetic record transducing apparatus for magnetically recording signals of the audio-frequency range on successive elements of a substantially demagnetized permanently magnetizable elongated record track; means for driving said record track in a forward direction at a given speed during recording and at said same given speed during erasing, said means for driving including an alternating current motor energizable with 60 cycle-per-second alternating electric current; an erasing head comprising a winding and a substantially closed elongated magnetic core interlinked with said winding and confining in said core the major part of the flux induced by electric currents in said winding, said core having along its outer surface a substantially continuous, elongated, exposed, convex guide surface for guiding thereover a substantial length of said record track as said record track is driven along a predetermined guide path portion extending substantially entirely on one side of said core so that at least a portion of said guide surface constitutes a contact portion which is in engagement with successive portions of the moving record track, the cross-sectional area of said core at the location where said record track first engages it being a minimum, forming a relatively short saturating region, and increasing gradually toward the end region of said guide surface in the forward direction of motion of said record track along said guide path; means for connecting said winding to 60 cycle-per-second alternating electric current for magnetizing said core to establish a record track saturating field in the said short saturating region and to establish in the distance between said short saturating region and said end region a flux field alternating at 60 cycles-per-second and to establish in said record track moving through said field at said given rate of speed at least three wave lengths decaying in intensity from said saturating region toward said end region where the field intensity is of such magnitude and the direction of the field is such as to substantially neutralize each successive elemental portion of the record track as it leaves said end region.

SEMI JOSEPH BEGUN.

REFERENCES CITED

The following references are of record in the file of this patent:

UNITED STATES PATENTS

| Number | Name | Date |
|---|---|---|
| 1,837,586 | Rhodehamel | Dec. 22, 1931 |
| 2,210,770 | Müller-Ernesti | Aug. 6, 1940 |
| 2,230,913 | Schuller | Feb. 4, 1941 |
| 2,288,862 | Weitmann | July 7, 1942 |
| 2,344,438 | Engler | May 18, 1943 |
| 2,351,004 | Camras | June 13, 1944 |
| 2,351,007 | Camras | June 13, 1944 |

FOREIGN PATENTS

| Number | Country | Date |
|---|---|---|
| 691,711 | France | Oct. 24, 1930 |
| 693,664 | Germany | July 16, 1940 |